United States Patent [19]

Rach et al.

[11] Patent Number: 4,635,697

[45] Date of Patent: Jan. 13, 1987

[54] WHEEL AND TIRE ASSEMBLY FOR A VEHICLE

[75] Inventors: Heinz-Dieter Rach, Garbsen; Hans-Ulrich Klose, Wiedensahl; Udo Frerichs, Langenhagen, all of Fed. Rep. of Germany

[73] Assignee: Continental Gummi-Werke Aktiengesellschaft, Hanover, Fed. Rep. of Germany

[21] Appl. No.: 701,952

[22] Filed: Feb. 15, 1985

[30] Foreign Application Priority Data

Feb. 15, 1984 [DE] Fed. Rep. of Germany ....... 3405363

[51] Int. Cl.[4] .......................................... B60C 15/024
[52] U.S. Cl. .................. 152/544; 152/379.3; 152/379.5; 152/DIG. 20
[58] Field of Search ............ 152/539, 540, 544, 379.3, 152/379.4, 379.5, DIG. 20

[56] References Cited

U.S. PATENT DOCUMENTS

| 560,660 | 5/1896 | Tomlinson | 152/544 |
|---|---|---|---|
| 579,309 | 3/1897 | Tomlinson | 152/544 |
| 1,885,484 | 11/1932 | Shoemaker | 152/379.3 |
| 4,563,042 | 1/1986 | Seitz et al. | 152/379.3 |
| 4,577,668 | 3/1986 | Seitz et al. | 152/379.3 |

FOREIGN PATENT DOCUMENTS

| 3000428 | 7/1981 | Fed. Rep. of Germany . | |
| 3145252 | 5/1983 | Fed. Rep. of Germany | 301/97 |
| 2030087 | 4/1980 | United Kingdom | 152/379.5 |

*Primary Examiner*—Lois E. Boland
*Attorney, Agent, or Firm*—Becker & Becker, Inc.

[57] ABSTRACT

A vehicle wheel having a rigid rim on which can be mounted a pneumatic rubber tire. The tire beads are adapted to be disposed on the radially inner side of the rim ring. Deep mounting beds are located axially inwardly of the rim seating surfaces for the tire bead. In order to prevent the penetration of water and dirt into the deep mounting beds, the tire beads each have a cross-sectional shape which on the one hand during mounting allow the tire bead to enter the mounting space having the deep bed, and on the other hand in the operating position of the tire close off the mounting space having the deep bed region.

9 Claims, 5 Drawing Figures

WHEEL AND TIRE ASSEMBLY FOR A VEHICLE

BACKGROUND OF THE INVENTION

1. Field of the Invention

The present invention relates to a vehicle wheel having a rigid rim on which can be mounted a pneumatic vehicle tire which is made of rubber or rubber-like synthetic material, and which has a carcass which is anchored in the beads of the tire by being looped around pull-resistant and compression-resistant bead cores. The rim is provided with rim flanges which extend essentially radially inwardly. Disposed on the radially inner periphery of the rim, next to the rim flanges, are seating surfaces for the tire, and next to these are recessed mounting portions or deep mounting beds which are delimited by vertical and/or inclined walls of the rim.

2. Description of the Prior Art

A vehicle wheel of this general type is disclosed, for example, in German Offenlegungsschrift No. 30 00 428, and also in co-pending U S. Pat. application Ser. No. 645,029 Mauk et al, which was filed on Aug. 28, 1984, and belongs to the assignee of the present application. Although vehicle wheels of this type have excellent driving characteristics during normal driving operation, and the tires mounted thereon can still be driven a considerable distance after a blow out without permanently damaging the tire, these wheels have a fundamental drawback in that due to the disposition of the tire beads on the radially inner side of the rim, a space results behind the tire beads; rain and wash water which has penetrated into this space can no longer flow off, and dirt can accumulate in this space.

To avoid these drawbacks, it has already been proposed to close-off the aforementioned mounting space having the deep mounting bed with the aid of a filler ring subsequent to mounting of the tire, or to protect this mounting space by means of a cover ring. However, both measures are rather expensive and complicated, and result in a not inconsiderable increase of the total weight.

An object of the present invention, in a vehicle wheel of the aforementioned general type, therefore is to close-off the mounting space in the vicinity of the deep mounting bed in a simpler manner than previously done.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The wheel and tire assembly of the present invention is characterized primarily in that each tire bead has a cross-sectional shape which on the one hand during mounting allows the tire bead to enter the mounting space having the deep bed, and on the other hand in the operating position of the tire closes off the mounting space having the deep bed.

The main advantages of the present invention are that in order to close off the deep mounting bed no separate component at all is any longer necessary, and that after complete introduction of the tire bead into the mounting space in the vicinity of the deep mounting bed, the tire, during inflation, moves on its own into its operating position and hense automatically closes-off the exposed space in the region of the deep mounting bed. Thus, not only is there the advantage of not needing an additional component, there is also the advantage of saving time and weight.

Pursuant to advantageous specific features of the present invention, the mounting space, on the radially inner side, may be delimited by a rim wall which extends either horizontally or at an angle axially outwardly. In the axially outer region of this wall, a projection of the adjacent tire bead may rest on the wall. In the thus-formed contact region between the rim wall and the projection of the bead, a raised element of the rim wall may extend into a groove of the bead proJection in the mounted state of the tire.

DESCRIPTION OF PREFERRED EMBODIMENTS

Figure 1:
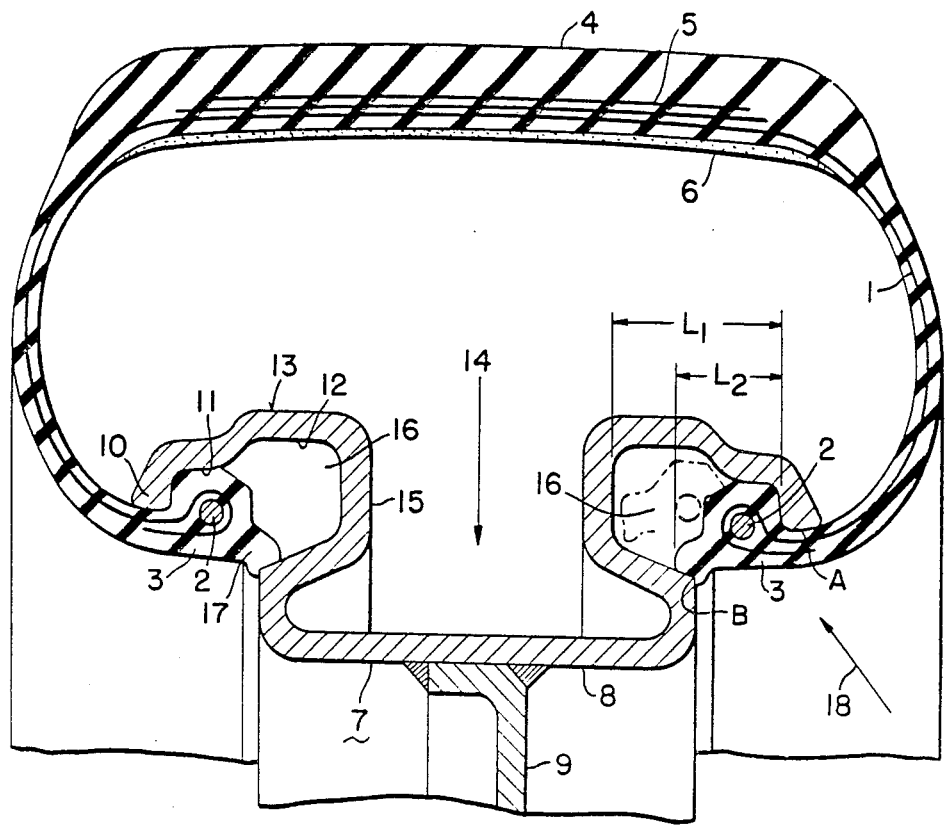
FIG. 1 is a view that shows a partial radial section of one inventive embodiment of a vehicle wheel having a mounting space for the tire bead and having a radially outwardly disposed well, the side wall of which forms the axial and radial inner boundary of the mounting space.

Referring now to the drawings in detail, FIG. 1 illustrates a vehicle wheel on which is mounted a pneumatic tire. The pneumatic vehicle tire which is used comprises essentially rubber or rubber-like material, and has a radial carcass 1; the carcass 1 could also be a bias carcass. The ends of the carcass 1 are anchored in the bead 3 by being looped around pull-resistant and compression-resistant bead cores 2. Disposed below the tread 4 and between the latter and the carcass 1 is a belt 5 which is inextensible in the circumferential direction, comprises two or more cord plies, and effects side stablization of the tire body. The inner surface of the tire, approximately in the region of the tread 4, is additionally provided with a thin slide layer 6 which, in the event of a blow out or flat tire, makes it possible to support the tire on the rim 7 in a frictionless manner.

The one-piece rim 7 has a rim ring 8 which is preferably made of metal and is welded onto a rim portion 9. When viewed in cross-section, the rim ring 8 ends laterally outwardly in a rim flange 10 which essentially extends radially inwardly. Disposed next to the rim flange 10 on the radially inner periphery of the rim ring 8 is a seating surface 11 for the tire bead 3. Disposed axially inwardly of, and adjacent to, the seating surface 11 is a deep mounting bed 12 for the tire bead 3. At the level of the mounting beds 12, the radially outer portions of the rim ring 3 are in the form of support surfaces 13 for the tire. A radially outwardly open drop-center or well 14 is disposed in the middle of the rim ring 8. In the radially inward direction, the well 14 is widened, so that the side walls 15 of the rim ring 8, which side walls delimit the well 14, initially extend vertically and then extend laterally outwardly at an angle.

As a result of the described shape of the rim ring 8, a mounting space 16, which is closed on three sides, is formed for the tire bead 3; the fourth side is closed-off by the tire bead 3 itself after the tire has been mounted. For this purpose, the radially and axially inner portion of the tire bead 3 is provided with a circumferential projection 17. In order to achieve a good closure or sealing effect, the projection 17 can be made a relatively soft rubber, and can be dimensioned large enough so that when it is subjected to great deformation, it exerts strong pressure against the adjacent part of the rim.

To mount the tire, the rim 7 is first moved toward the tire, essentially at right angles thereto, until the greatest diameter of the rim is disposed within the tire. After the rim is turned relative to the tire by about 90°, the axes of rotation of the tire and of the rim 7 extend parallel to one another, and the tire beads 3 are disposed laterally outwardly of, and next to, the associated rim flanges 10.

First one tire bead 3, possibly accompanied by a slight pivoting about its bead core 2, is introduced in the direction of the arrow 18 (FIG. 1) into the mounting space 16 between the tip A of the rim flange and edge B of the well side wall 15. It is readily apparent that for a reliable sealing of the mounting space 16, the diameter of the tire bead 3 in the operating position, in the direction A-B, must be at least as great as the distance $\overline{AB}$. However, during mounting, the projection of the bead diameter, measured at right angles to the direction of introduction (arrow 18), must be less than the distance $\overline{AB}$.

The deep mounting bed 12 is dimensioned such that when the tire bead 3 is completely introduced therein, the tire bead 3 on the opposite side can be lifted over the rim flange 10. The inside open distance $L_1$ between the rim flange 10 and the side delimiting wall 15 of the deep bed 12 should be at least 1.5 times the width $L_2$, which the projection of the bead width assumes along a horizontal in the operating position.

After both tire beads 3 are entirely disposed in their associated mounting spaces 16 having the deep beds 12, the tire is inflated with air. In so doing, the tire beads 3, while at the same time pivoting back about the bead cores 2, are pulled onto the rim seating surfaces 11; a closing-off of the mounting spaces 16 is automatically effected by means of the projections 17. To demount the tire, an appropriate tool is placed in the vicinity of the projection 17 and is pressed into the mounting space 16.

Figure 2:
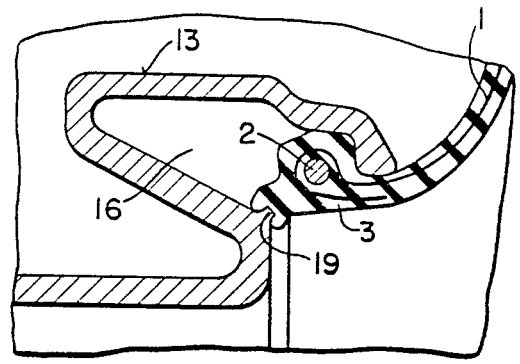
FIG. 2 is a fragmentary, partially sectioned view that shows a portion of another inventive embodiment of a vehicle wheel, with the rim being provided with wider support surfaces for supporting the tire during an emergency operation.

The wheel of FIG. 2 differs from that of FIG. 1 on the one hand in that the support surfaces 13 for the tire are wider, and on the other hand in that, to improve sealing of the mounting space 16, the rim 7 is provided with a circumferential raised element 19, and the projection 17 is provided with a corresponding groove. It is also possible to reverse this latter arrangement, so that the rim 7 has a groove and the projection 17 has a raised element.

Figure 3:
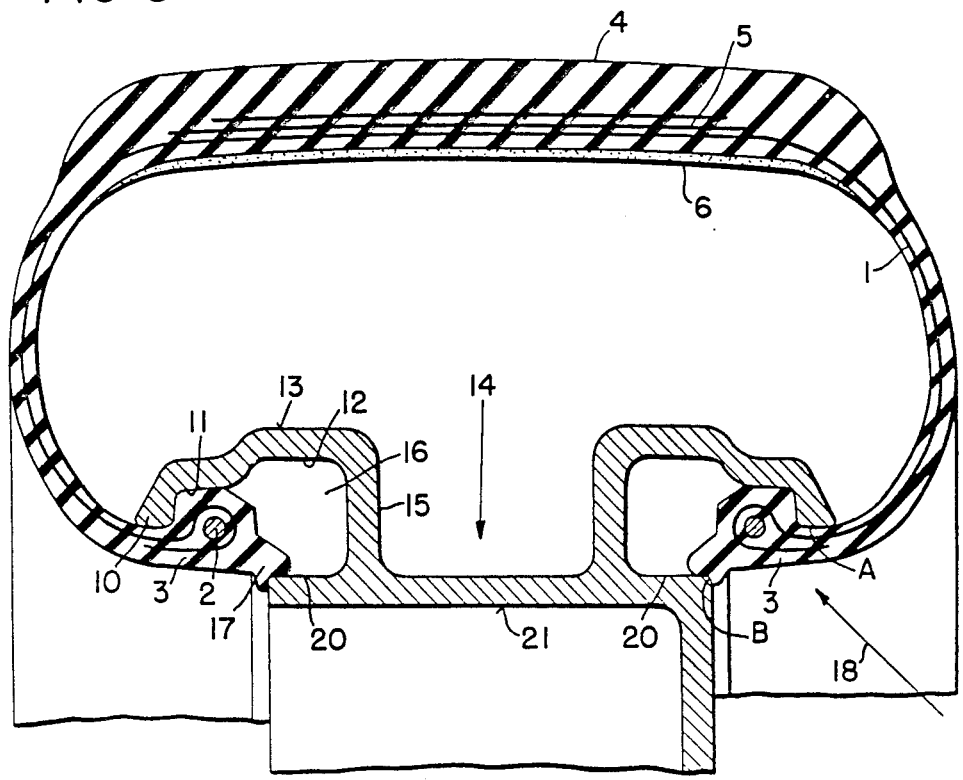
FIG. 3 is a view showing a partial radial section of a further inventive embodiment of a vehicle wheel having a tire bead mounting space which is delimited by a side wall of the radially outer well and by an extension of the base of the well.

The wheel of FIG. 3 also has a rim shape which differs from that of FIG. 1. The primary differences are a well 14 which has a rectangular cross section, and annular, lateral extensions 20 of the base 21 of the well 14. The axially outer edges B of the annular extensions 20 serve as support surfaces and sealing surfaces for the projections 17. Taken as a whole, the rim ring 8 does not extend as far in the radial direction as do the rim rings of the previous embodiments, so that larger mounting spaces 16 are obtained for brakes.

Figure 4:
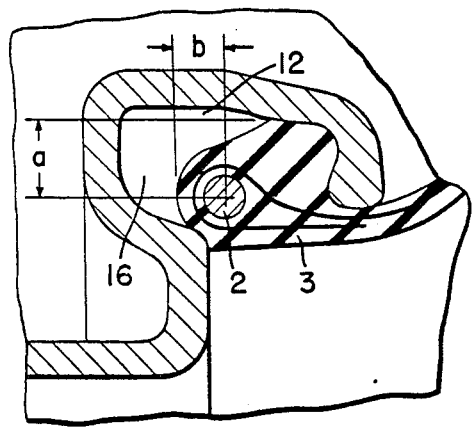
FIG. 4 is a view that shows a portion of another inventive embodiment of a vehicle wheel having a deep bed of reduced radial extension, and having a tire bead in which the core is eccentrically disposed.
Figure 5:
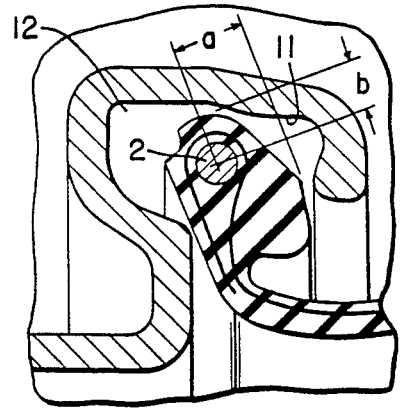
FIG. 5 is a view that shows the wheel of FIG. 4 with the bead in the mounting position.

FIG. 4 shows a portion of a vehicle wheel in which the bead core 2 is eccentrically disposed in the bead 3 in the sense that in the operating position the distance "a" between the rim bead seating surface 11 and a line which is parallel to the axis of rotation and which passes through the center of the bead core, is considerably greater than the distance "b" from the center of the bead core to the axially inner edge of the bead. With this arrangement, it is possible to get by with a considerably lesser radial dimension for the deep bed 12. Figure 5 illustrates the wheel of FIG. 4 in the mounting position of the tire bead 3. The shape of the mounting space 16 and of the tire bead 3 as illustrated in FIGS. 4 and 5 can be utilized in combination with the rims 7 of FIGS. 1 and 2, or with the rim of the embodiment of FIG. 3.

The present invention is, of course, in no way restricted to the specific disclosure of the specification and drawings, but also encompasses any modifications within the scope of the appended claims.

What we claim is:

1. A wheel and tire assembly for a vehicle, with said wheel having a rigid rim on which can be mounted a pneumatic tire of rubber or rubber-like synthetic material; said tire having a carcass which is anchored in the tire beads by being looped around pull-resistant and compression-resistant bead cores; said rim having essentially radially inwardly extending rim flanges having a mounting space located axially inward of the rim flanges, and next to these and axially inwardly thereof on its radially inner periphery, said rim has seating surfaces for said tire beads; disposed next to each seating surface, and axially inwardly thereof, is a respective deep mounting bed, which is apart of a respective mounting space which is delimited by wall portions of said rim;

the improvement wherein each of said tire beads is provided with a predetermined cross-sectional shape including an integral radially inwardly located and axially extending means which on the one hand, during mounting of said tire on said rim, allows said tire bead to enter into said mounting space axially inward of the rim flanges along with said deep bed, and on the other hand, said means in the operating position of said tire, closes-off said mounting space to protect against rain and wash water penetrating into the mounting space as well as to protect against dirt accumulation in this mounting space without any need for filling and covering rings.

2. A wheel and tire assembly according to claim 1, in which said rim includes, for each of said mounting spaces, an axially outwardly extending wall portion for delimiting the radially inner side of said mounting space; and in which each of said tire beads is provided with a projection which, in the operating state of said tire, rests against the axially outer portion of said axially outwardly extending rim wall portion.

3. A wheel and tire assembly according to claim 2, in which said axially outwardly extending wall portion of said rim extends parallel to the axis of rotation of said rim.

4. A wheel and tire assembly according to claim 2, in which said axially outwardly extending wall portion of said rim extends at an angle to the axis of rotation of said rim.

5. A wheel and tire assembly according to claim 2, in which, in said region where said bead projection rests against said axially outwardly extending rim wall portion, the latter is provided with a raised element which, in the operational state of said tire, extends into a groove provided in said projection of said tire bead.

6. A wheel and tire assembly according to claim 2, in which said projection of said tire bead is made of relatively soft rubber.

7. A wheel and tire assembly according to claim 1, in which said rim includes, for each of said mounting spaces, a radially outwardly extending wall portion for delimiting the axially inner side of said mounting space; and in which the inside open distance between a given rim flange and the associated radially outwardly extending wall portion is at least 1.5 times the width which the projection of said tire bead assumes in the operating position, measured parallel to the axis of rotation of said rim.

8. A wheel and tire assembly according to claim 1, in which each of said beads is pivotable about its bead core.

9. A wheel and tire assembly according to claim 8, in which each of said bead cores is eccentrically disposed in its bead in such a way that, in the operating position of said tire, the radial distance from the center of said bead core to an extension of said rim seating surface for said bead is greater than the distance from the center of said bead core to the axially inner edge of said bead.

* * * * *